(12) United States Patent
Howard (10) Patent No.: US 6,393,683 B1
(45) Date of Patent: May 28, 2002

(54) MASKING APPLICATION APPARATUS AND METHOD FOR APPLICATION OF A MASK

(75) Inventor: Randolph E. Howard, Snohomish, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/343,100

(22) Filed: Jun. 29, 1999

(51) Int. Cl.[7] ............................................... B23P 19/02
(52) U.S. Cl. ........................................ 29/235; 29/234
(58) Field of Search ...................... 29/235, 234, 281.1, 29/281.6, 283.5, 238, 255, 263

(56) References Cited

U.S. PATENT DOCUMENTS

| | | | |
|---|---|---|---|
| 4,461,069 A | * | 7/1984 | Chiecchi .................... 29/564.8 |
| 4,590,656 A | * | 5/1986 | Wieland et al. ............... 29/450 |
| 4,685,189 A | | 8/1987 | Palmqvist et al. |
| 4,785,517 A | * | 11/1988 | Takano ........................ 29/235 |
| 4,868,976 A | | 9/1989 | Holt et al. |
| 5,087,492 A | | 2/1992 | Vallauri et al. |
| 5,098,752 A | | 3/1992 | Chang et al. |
| 5,486,388 A | | 1/1996 | Portas et al. |
| 5,492,740 A | | 2/1996 | Vallauri et al. |
| 5,560,969 A | | 10/1996 | Portas |
| 5,589,667 A | | 12/1996 | Tsukazaki et al. |
| 5,800,886 A | | 9/1998 | Vallauri et al. |
| 6,044,539 A | * | 4/2000 | Guzowski .................... 29/453 |

* cited by examiner

Primary Examiner—Joseph J. Hail, III
Assistant Examiner—Lee Wilson
(74) Attorney, Agent, or Firm—Lawrence W. Nelson (57) ABSTRACT

A masking device that masks the fitting on a tube assembly. The masking device includes a clamping assembly that supports the fitting of the tube assembly once it is inserted into the device. The masking device also includes an extension assembly that moves relative to the clamping assembly and has a plurality of stretching members that stretch an elastic sleeve to a diameter equal to or greater than the fitting. The masking device also has a drive assembly that moves the extension assembly relative to the housing and the clamping assembly.

18 Claims, 5 Drawing Sheets

MASKING APPLICATION APPARATUS AND METHOD FOR APPLICATION OF A MASK

BACKGROUND OF THE INVENTION

1. Field of the Invention

The present invention relates to the masking of an assembly, and more particularly, to an apparatus and method for applying an elastic mask to an assembly.

2. Background Information

Figure 1:
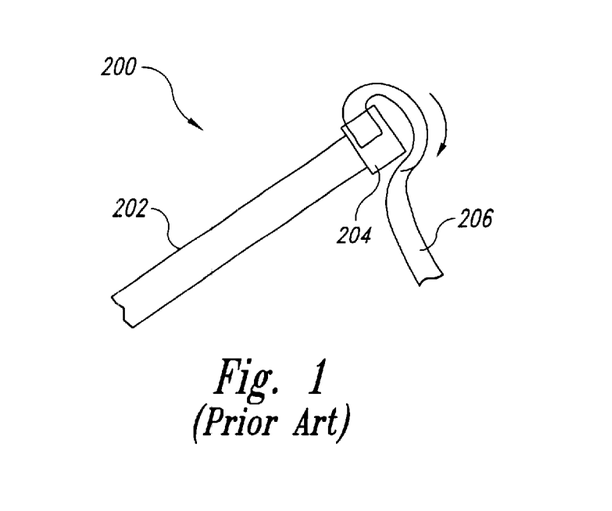
FIG. 1 shows a prior art method of masking a tube assembly.

As is known, tubing of various shapes and sizes is used in a variety of industries, from refineries, to construction, to the automotive and aircraft industry. Often, these industries require that the tubing be coupled to another component to form a tube assembly 200, as shown in FIG. 1. For example, the tubing, such as tubing 202, shown in FIG. 1, is coupled to a fitting 204 to form the tube assembly 200.

The tubing 202 must often be painted to prevent or deter corrosion. However, since the fitting 204 is often comprised of different materials than the tubing 202, it may not require the same type of paint as the tubing 202. Frequently, it is undesirable to paint the fitting 204 because it uses movable parts to engage another tube or fitting.

The tubing 202 and the fitting 204 are frequently coupled using either an orbital welding or swaging process to form the tube assembly 200. These joining processes cannot be properly performed if the tubing 202 is pre-painted. Thus, the tubing 202 requires painting after being coupled to the fitting 204. This poses a problem since paint could adversely affect the fitting 204. Some means is necessary to prevent the inadvertent painting of the fitting 204 after it is coupled to the tube 202.

Currently, the fitting 204 of the tube assembly 200 is hand masked with special tape, such as stripping tape 206 or masking dots which are precut adhesive coverings. The tube assembly 200 is then painted, heat cured, and the stripping tape 206 is removed by hand. Unfortunately, the application of the stripping tape 206 or masking dots by hand is slow, tedious, and must be performed carefully. Hand masking is also labor intensive and tends to cause hand strain, especially when an operator is continuously applying the masking material. Further, the stripping tape 206 or masking dots are expensive since they must be heat resistant, and retain their adhesive properties during curing. Also, since the stripping tape 206 or masking dots are heated prior to their removal from the fitting 204, they are difficult to remove after having undergone the painting and heat curing process.

Consequently, there is a need in the art for an inexpensive masking process that uses a masking material that can be quickly applied and removed in a reliable manner. Preferably, the method should be easily adaptable to different size fittings, and only require a low level of skill to implement.

SUMMARY OF THE INVENTION

According to one aspect, the present invention relates to a masking application apparatus that masks a designated portion of a component assembly with an elastic sleeve. The apparatus includes a housing, a clamping assembly for supporting the portion of the component assembly inserted into the apparatus, an extension assembly movable relative to the clamping assembly, and a drive assembly for moving the extension assembly relative to the housing and the clamping assembly.

According to another aspect, the present invention relates to a method of masking a portion of an assembly. The method includes the steps of slipping an elastic sleeve of masking material over a plurality of stretching members, stretching the elastic sleeve to a diameter greater than a diameter of the portion of the assembly being masked, and positioning the portion of the assembly within the elastic sleeve. The method also includes the steps of clamping the elastic sleeve and a portion of the assembly into a fixed position, and withdrawing the stretching members from the elastic sleeve leaving the portion of the assembly masked.

According to yet another aspect, the present invention relates to a masking system including an assembly having a first portion to be exposed, and a second portion to be masked. The system also includes an elastic sleeve having a diameter and length, where the length of the elastic sleeve is equal to or greater than a length of the second portion of the assembly. The assembly further includes an extension device that expands the diameter of the elastic sleeve to a diameter equal to or greater than a diameter of the second portion of the assembly. The extension device is removed from the elastic sleeve once the second portion is covered by the elastic sleeve.

BRIEF DESCRIPTION OF THE DRAWINGS

Features and advantages of the present invention shall now be illustrated with reference to embodiments represented as non-limiting examples in the enclosed drawings, wherein.

DETAILED DESCRIPTION OF THE PREFERRED EMBODIMENTS

A masking application apparatus 20, as shown in FIGS. 2 through 4a, includes a housing 21, a radial clamping assembly 22, an extension assembly 24, and a drive assembly 26. The masking apparatus 20 is used to apply an elastic sleeve 28 onto a predetermined portion of a component, shown in the illustrated embodiment as a tube assembly 34 having a fitting 30 coupled to a tube 32. The masking application apparatus 20 dramatically reduces the cycle time required for masking a portion of the tube assembly 34, such as the fitting 30. Another advantage provided by the masking application apparatus 20 is that it uses less expensive masking materials, and provides a reliable, consistent mask over the fitting 30. The masking apparatus 20 provides all of the above advantages, yet it requires little skill to operate.

Figure 2:
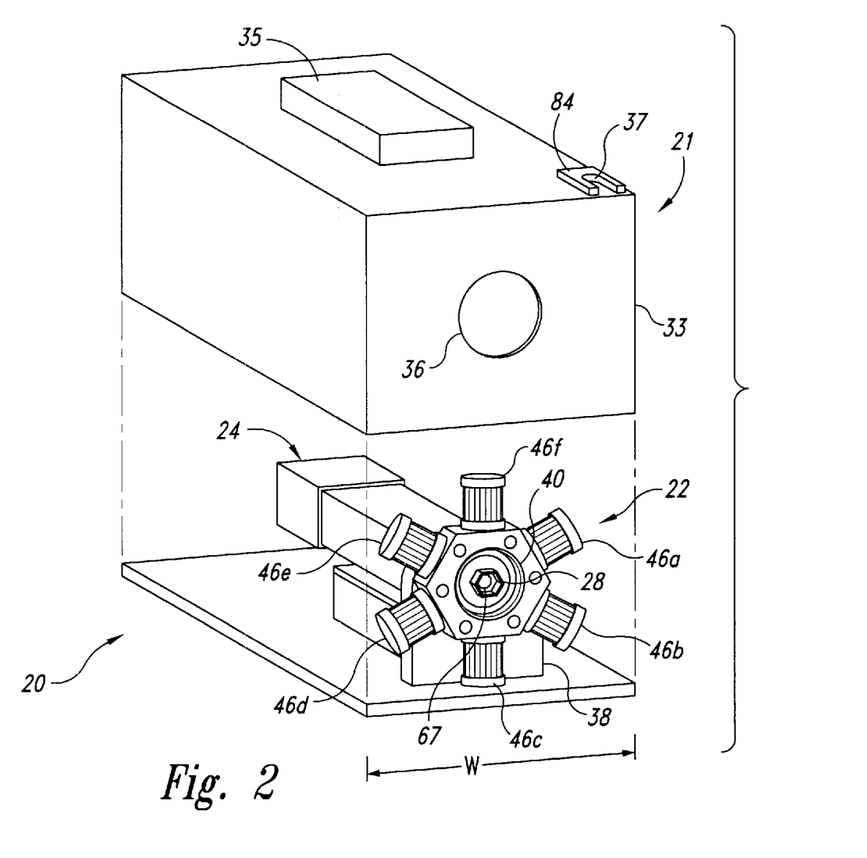
FIG. 2 shows a perspective view of a masking application apparatus according to the present invention.
Figure 3A:
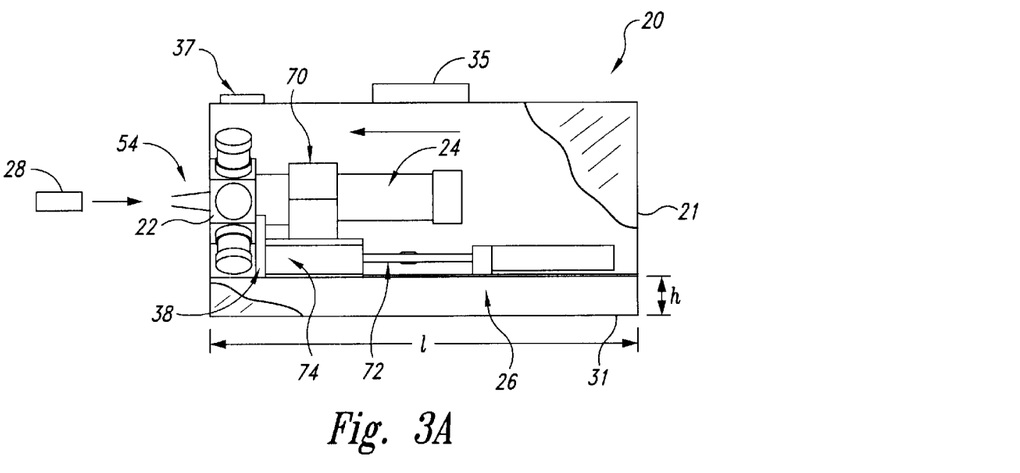
FIG. 3a shows a cross-sectional side view of the masking application apparatus in an extended position.

As shown in FIGS. 2 and 3a, the elastic sleeve 28 is loaded onto the apparatus 20 which in turn expands the sleeve 28 so it can be applied over the fitting 30, to prevent it from being painted. Preferably, the elastic sleeve 28 is made out of natural latex, or a synthetic latex or some other elastomer, such as polyurethane sleeving. The sleeve 28 has the advantage of being quickly applied over the portion of the assembly 34 to be covered, such as the fitting 30. This application process can be as quick as 5 seconds as opposed to the prior art method which can take approximately 2 minutes.

The elastic sleeve 28 is easily removed even after being painted and heat treated. Removal is accomplished by simply snipping a portion of or the entire sleeve 28 with either a hot knife or scissors. The prior art method required unwrapping the heat treated adhesive material by hand, and could take up to approximately 7 minutes to perform. By using the elastic sleeve 28, removal time is reduced down to approximately 10 seconds. The elastic sleeve 28 also allows an operator to use the apparatus 20 instead of applying a mask by hand, thus preventing any discomfort or injuries associated with repetitive and straining use of the hands. The elastic sleeve 28 is easily adaptable to different size components or fittings.

Preferably, the elastic sleeve 28 has a thickness of 0.020 inches±0.005 inches. If the elastic sleeve 28 is too thick, then it tends to lack flexibility, while if the elastic sleeve 28 is too thin, then it will easily tear when stretched over the fitting 30.

The internal diameter of the elastic sleeve 28 must be slightly smaller than the tube 32. For example, for a ⅜ inch tube, the internal diameter of the elastic sleeve 28 is preferably 0.375 inches+0.000−0.015 inches.

The housing 21 of the masking apparatus 20, as shown in FIGS. 2 and 3a, includes a base 31 having a width (w), and a length (l), as well as a height (h), the apparatus 20 is raised off an elevated support surface, such as a table. The housing 21 also includes a machine cabinet 33, used to enclose the apparatus 20. The machine cabinet 33 is preferably made of sheet metal, and is removably coupled to the base 31 using either screws, clips, or some other fastening device. The top of the machine cabinet 33 preferably includes a handle 35 for allowing transport of the masking application apparatus 20, and a mounting platform 37 for engaging a control knob 84. As shown in FIG. 2, the machine cabinet 33 has four sides, where a front side has an alignment porthole 36, which allows insertion and positioning of the tube assembly 34 within the radial clamping assembly 22. The porthole 36 assists in maintaining proper alignment between the tube assembly 34 and the extension assembly 24.

The radial clamping assembly 22 of the masking application apparatus 20, as shown in FIGS. 2, 3a, 4a, and 5a–c holds the tube assembly 34 in position while the extension assembly 24 is extracted from the elastic sleeve 28. The radial clamping assembly 22 eliminates any chance that the elastic sleeve 28 will be inadvertently displaced while the extension assembly 24 is removed from between the fitting 30 and the elastic sleeve 28.

The radial clamping assembly 22 includes a support 38 attached to the base 31 to hold the clamping assembly 22 in a fixed position relative to the housing 21. The support 38 is attached to an annular head 40 of the radial clamping assembly 22, as shown in FIG. 2. The annular head 40 has a main orifice 42 into which the portion of the tube assembly 34 to be masked, i.e., the fitting 30, is inserted via the alignment porthole 36. The annular head 40 also includes a plurality of side holes 44. Preferably, there are six side holes 44a–44f, each orthogonal to a radial axis of the main orifice 42, as shown in FIG. 5b.

Figure 5A:
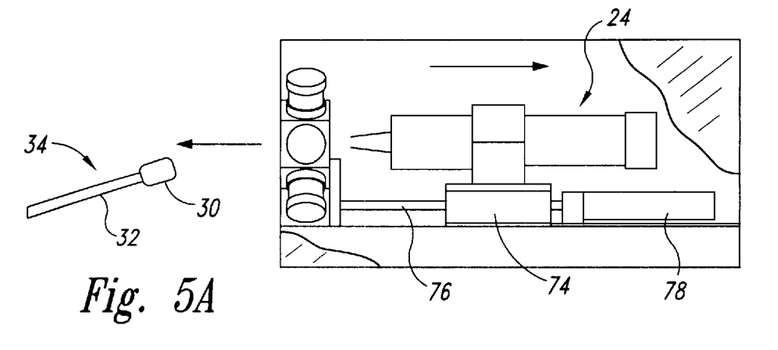
FIG. 5a shows a cross-sectional side view of the masking application apparatus in a retracted position.
Figure 5B:
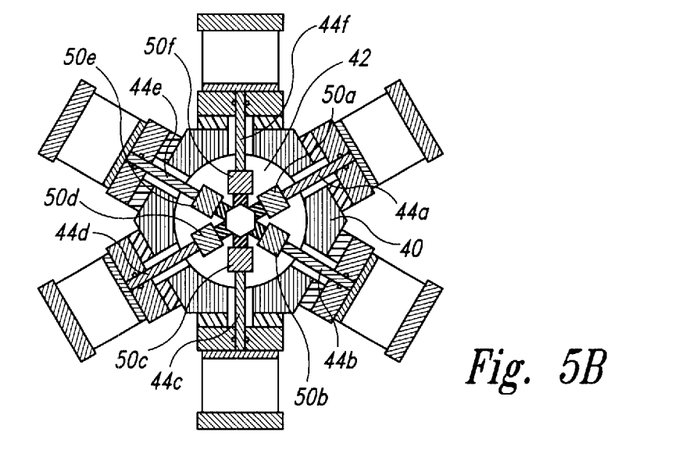
FIG. 5b shows a cross-sectional front view of a radial clamping assembly of the masking apparatus in a clamping step of the retracted position.
Figure 5C:
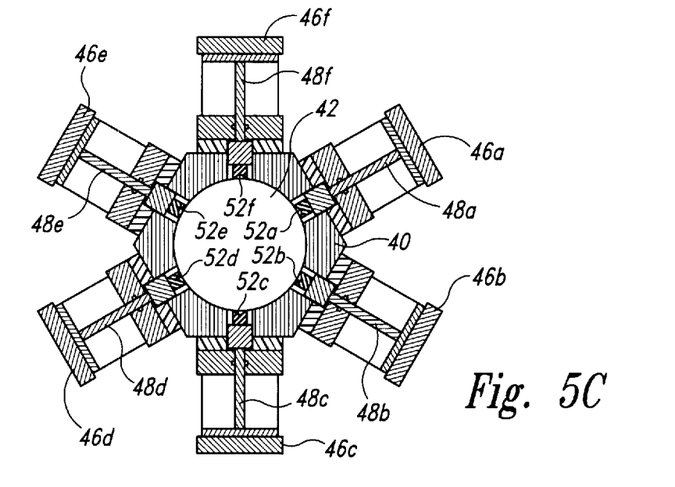
FIG. 5c shows a cross-sectional front view of the radial clamping assembly of the masking apparatus in a retracted step of the retracted position.

The radial clamping assembly 22 also includes a plurality of radial clamps 46; preferably each of the plurality of side holes 44a–44f is assigned a respective one of radial clamps 46a–46f, where each of the radial clamps 46a–46f is coupled to the annular head 40, as shown in FIGS. 2, 5b, and 5c.

Each of the radial clamps 46a–46f, as shown in FIGS. 5b and 5c, includes respective clamp cylinders 48a–48f. When pneumatic pressure is applied to the respective cylinders 48a–48f, it forces out radial pistons 50a–50f. Each of the radial pistons 50a–50f includes a proximal end coupled to and moved along the same axis as its respective one of the clamp cylinders 48a–48f, and a distal end or tube clamp 52a–52f shaped to engage the inserted fitting 30 of the tube assembly 34. Each of the radial clamps 46a–46f is mounted relative to a respective one of the side holes 44a–44f, such that the radial pistons 50a–50f move through a respective one of the side holes 44a–44f.

Figure 3B:
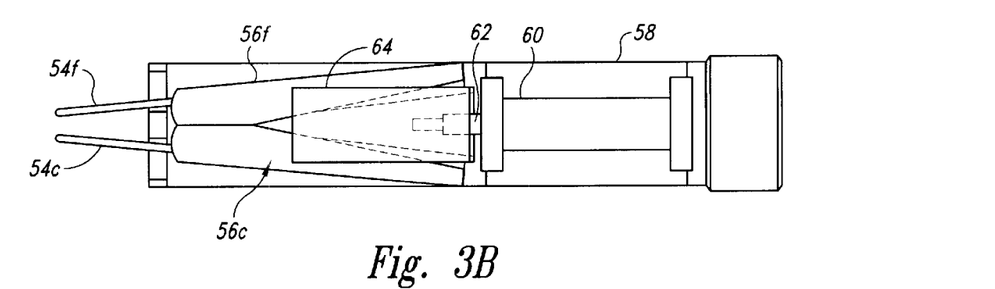
FIG. 3b shows a cross-sectional plan view of an extension assembly of the masking application apparatus in the extended position.
Figure 3C:
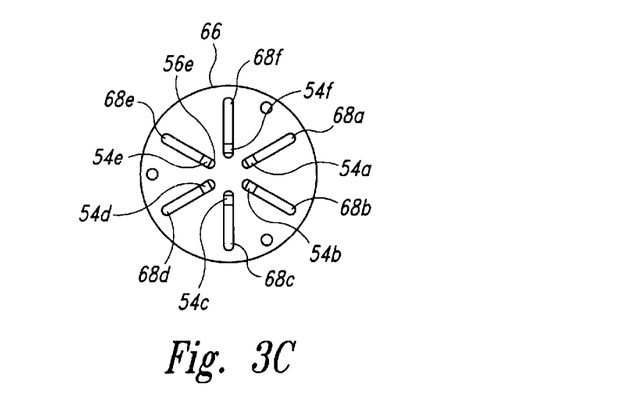
FIG. 3c shows a front view of the extension assembly of the masking application apparatus in the extended position.

The extension assembly 24 of the masking application apparatus 20, as shown in FIGS. 3a–3c, expands the elastic sleeve 28 to a diameter capable of receiving the predetermined portion of the tube assembly 34, such as the fitting 30. The extension assembly 24 eliminates the need to expand the sleeve 28 by hand, increasing the production cycle time and eliminating any physical discomfort associated with repeated manual applications of the elastic sleeve 28. The extension assembly 24 is also movable relative to the clamping assembly 22, allowing easy loading of the elastic sleeve 28 and removal of the extension assembly 24 once the fitting 30 has been masked.

The extension assembly 24 includes a plurality of expansion fingers 54, preferably six expansion fingers 54a–54f. Each of the expansion fingers 54a–54f is small in diameter yet strong and relatively non-elastic. The expansion fingers 54a–54f, as shown in FIG. 3c, are movable relative to the radial axis of the annular head 40 and are used to expand the elastic sleeve 28 to a diameter greater than or equal to a diameter of the fitting 30.

Figure 4A:
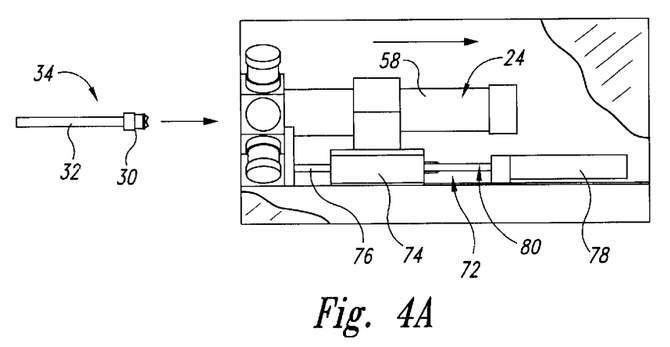
FIG. 4a shows a cross-sectional side view of the masking application apparatus in a masking position.

The expansion fingers 54a–54f are movable relative to a longitudinal plane that is defined as bisecting the annular head 40, and normal to the radial axis of the annular head 40. The expansion fingers 54a–54f preferably move out to one of three positions. The first position is a loading/extended position, where the expansion fingers 54a–54f are contracted together and extended forward of the annular head 40, as shown in FIG. 3a. The first position allows easy loading of the elastic sleeve 28 onto the expansion fingers 54a–54f. The second position is an insertion/masking position, where the expansion fingers 54a–54f are expanded and are drawn into the annular head 40, as shown in FIG. 4a. In the third position, a retracted position, the expansion fingers 54a–54f are relaxed and moved to a rearward position relative to the annular head 40, as shown in FIG. 5a.

The mechanism for expanding and contracting the plurality of expansion fingers 54a–54f is contained within a stainless steel containment tube 58, as shown in FIG. 3b.

The stainless steel containment tube 58 contains a plurality of levers 56, preferably six levers 56a–56f, each corresponding to one of the expansion fingers 54a–54f, where a distal end of each of the levers 56a–56f is attached to an end of a respective one of the expansion fingers 54a–54f, as shown in FIGS. 3b and 3c. Each of the levers 56a–56f has a proximal end which is mounted to the stainless steel containment tube 58 in a manner that allows the point of mounting to act as a fulcrum such that the levers 56a–56f are swingingly engaged to the containment tube 58. Each of the levers 56a–56f is spring loaded so as to rest in a position where the distal end of each of the levers 56a–56f are contracted relative to one another toward a radial axis of the containment tube 58.

Figure 6:
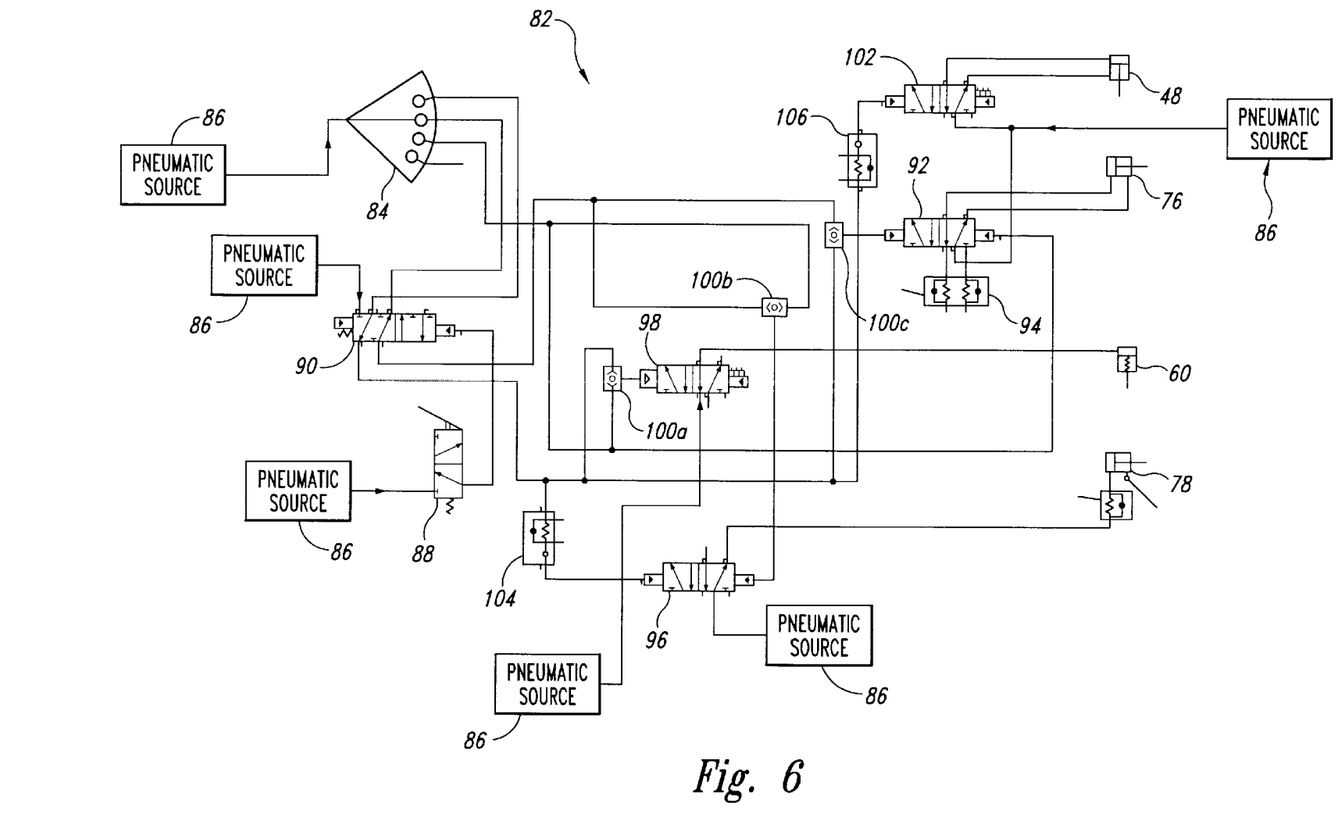
FIG. 6 shows a pneumatic control schematic diagram for the masking application apparatus.

The stainless steel containment tube 58, as shown in FIG. 3b, also contains a pneumatic expansion cylinder 60, which is powered by a pneumatic air source 86, shown in FIG. 6. The expansion cylinder 60 includes an expansion piston 62 that traverses the radial axis of the tube 58.

The containment tube 58 further contains a cylindrical ramp 64, as shown in FIG. 3b, which is coupled to the expansion piston 62. The cylindrical ramp 64 is driven against the plurality of levers 56a–56f in ramping engagement to spread apart each of the respective expansion fingers 54a–54f and move them away from the radial axis of the containment tube 58. When the cylindrical ramp 64 is withdrawn, the spring loaded levers 56a–56f contract toward each other and toward the radial axis of the containment tube 58. This arrangement provides a means of uniformly spreading and contracting the expansion fingers 54a–54f in a continuous manner The extension assembly 24 also includes a forward grid plate 66, as shown in FIG. 3c, which is coupled to a forward end of the containment tube 58. The forward grid plate 66 includes a plurality of elongated guides 68a–68f used to guide a respective one of the expansion fingers 54a–54f, where each of the respective expansion fingers 54a–54f passes through a respective one of the guides 68a–68f. The forward guide plate 66 guides and limits the movement of each of the expansion fingers 54a–54f to ensure an even expansion of the elastic sleeve 28.

The extension assembly 24 has a movement stop 67, shown in FIG. 2, which prevents further insertion of the tube assembly 34 into the elastic sleeve 28 and ensures proper alignment of the elastic sleeve 28 and the fitting 30.

The drive assembly 26 of the masking apparatus 20, as shown in FIG. 3a, moves the extension assembly 24 in a smooth and consistent manner relative to the housing 21 and the clamping assembly 22. The drive assembly 26 includes a coupling ring 70, which is coupled to and supports the extension assembly 24 by encompassing a portion of the circumference of the containment tube 58. The drive assembly 26 also includes a guide bar 72 positioned along the length of the base 31 of the housing 21.

A moving platform 74, also part of the drive assembly 26, is attached to the coupling ring 70 and slidingly engages the guide bar 72 allowing movement of the extension assembly 24 along the length of the guide bar 72.

The moving platform 74 includes an extract cylinder 76, as shown in FIG. 4a and is used to drive the platform 74 along the length of the guide bar 72. When the extract cylinder 76 is in a retracted position, the moving platform 74 is in its most forward position relative to the clamping assembly 22, as shown in FIG. 3a. When the extract cylinder 76 is in its fully extended position, the moving platform 74 is in its rearmost position relative to the clamping assembly 22, as shown in FIG. 5a.

The drive assembly 26 also includes a stop cylinder 78, as shown in FIG. 4a, which impedes the movement of the moving platform 74 being driven by the extract cylinder 76. The platform 74 and hence the extension assembly 24 is stopped by the stop cylinder 78 at a predetermined position which aligns the expansion fingers 54a–54f with the annular head 40. The stop cylinder 78 has a stop piston 80, which when fully extended counteracts the movement of the extract cylinder 76 and stops the movement of the moving platform 74 at the predetermined position, as shown in FIG. 4a. When the stop cylinder 78 is fully retracted, the extract cylinder 76 is allowed to complete its full stroke driving the moving platform 74 to the retracted position shown in FIG. 5a.

The elastic sleeve 28 can be used within the following process to mask a predetermined portion of a component assembly. Initially, masking material, such as the elastic sleeve 28, is slipped over a plurality of stretching members, represented in the illustrated embodiment as expansion fingers 54a–54f Then, the elastic sleeve 28 is stretched to a diameter greater than or equal to the diameter of the predetermined portion of the component assembly to be masked, such as the fitting 30. The portion of the component assembly to be masked is then positioned within the expanded elastic sleeve 28, where it is clamped into place. For example, the elastic sleeve 28 is pinned against the fitting 30 of the component assembly, represented in the illustrated embodiments as the tube assembly 34, to keep the sleeve 28 in the same position relative to the fitting 30. Next, the plurality of stretching members, i.e., the expansion fingers 54a–54f, are withdrawn from between the elastic sleeve 28 and the fitting 30, leaving the portion of the component assembly, i.e., the fitting 30, masked by the elastic sleeve 28 and ready for painting. The component assembly having been masked is then painted and heat treated so that only, for example, the tube 32 is painted and cured while the fitting 30 is unchanged by the painting or heat treating process. Finally, the elastic sleeve 28 is removed, either by slipping off or cutting at least a portion of the elastic sleeve 28 with a hot knife, scissors, or other cutting device.

The masking apparatus 20 performs the above-described method for applying a mask to an assembly according to the following method using the pneumatic control system 82, as shown in FIG. 6.

The control knob 84 is used to operate one or more of the clamp cylinders 48, the extract cylinder 76, the expand cylinder 60, and the stop cylinder 78, all of which are powered by the pneumatic source 86. The control knob 84 has four settings. An auxiliary setting (aux) causes the expansion fingers 54a–54f to expand and remain open as shown in FIG. 2. The auxiliary setting is used for special applications when there is a need to mask an unusually shaped tube assembly outside of machine cabinet 33.

Figure 4B:
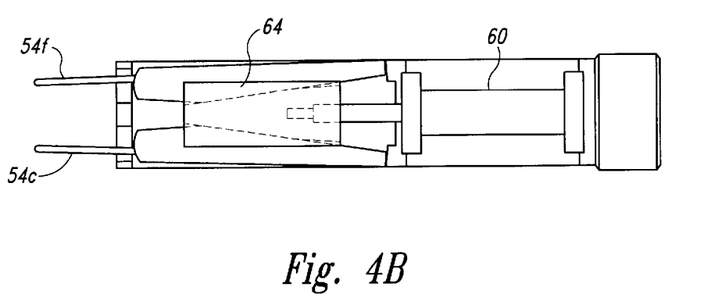
FIGS. 4b and 4c show a cross-sectional plan view and a front view, respectively, of the extension assembly in a partially extended masking position.
Figure 4C:
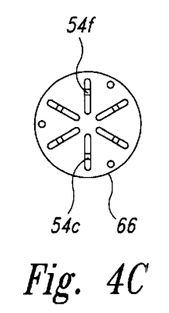
Figure 4D:
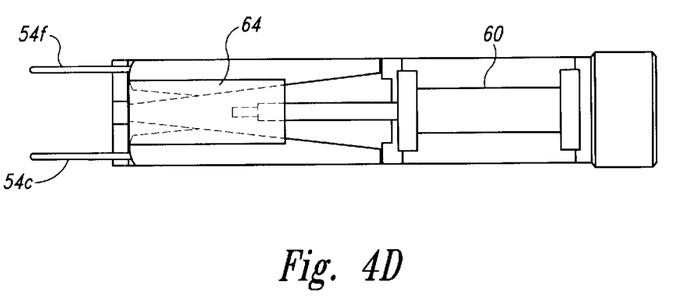
FIGS. 4d and 4e show a cross-sectional plan view and a front view, respectively, of the extension assembly in a fully extended masking position.
Figure 4E:
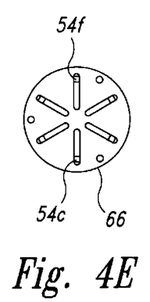

The next setting on the control knob 84 is the extension setting (extend), which causes the extension assembly 24 to contract the expansion fingers 54a–54f and move to a fully forward position as shown in FIGS. 3a–3c. Another setting is the mask setting (mask), which causes the extension assembly 24 to align the expansion fingers 54a–54f with the annular head 40, as shown in FIG. 4a. The expansion fingers 54a–54f are expanded, as shown in FIGS. 4b and 4c, to at least a diameter of the fitting 30, or to a fully extended position, as shown in FIGS. 4d and 4e. At this point, the fitting 30 is inserted within the expanded mask 28 until it hits the movement stop 67.

The next setting on the control knob 84 is the retract setting (retract). The retract setting causes two steps to be performed by the apparatus 20. The first step, i.e., the clamping step, causes the radial clamp assembly 22 to extend each of the radial pistons 50a–50f to fasten the elastic sleeve 28 to the fitting 30 and to hold the tube assembly 34 in position, as shown in FIG. 5b. The second step, i.e., the retraction step, as shown in FIG. 4b, causes the expansion fingers 54a–54f to relax by contracting the expansion cylinder 60, and hence the cylindrical ramp 64. Then, the extension assembly 24 is retracted by allowing the stop cylinder 78 to retract so that it no longer prevents the extract cylinder 76 from moving the extension assembly 24 to its rearmost point on the guide rails 72, as shown in FIG. 5a. Once the extension assembly 24 is retracted, the radial clamping assembly 22 is opened, as shown in FIG. 5c, and the tube assembly 34 is removed.

As shown in FIG. 6, the apparatus 20 also includes a foot switch 88, which allows an operator to control the masking and retraction settings using foot activation to keep hands free to position the tube assembly 34. A foot switch isolator 90 allows operation of either the control knob 84 or the foot switch 88 to activate the masking retraction settings.

The pneumatic control system 82, shown in FIG. 6, operates in the following manner to perform the above-described masking process.

Initially, the control knob 84 is switched to the extend setting. This setting causes the pneumatic source 86 to be supplied to a pilot of an extend directional control valve 92. The extend directional control valve 92 is piloted to shift, thus causing the extract cylinder 76 to retract and move the extension assembly 24 to a fully forward position. An extract flow restrictor 94 slows down the movement of the extract cylinder 76 causing the moving platform 74 to be repositioned in a controllable manner.

Next, the operator places the elastic sleeve 28 on the contracted expansion fingers 54a–54f, and turns the control knob 84 to the masking setting. At this setting, the previous pilot signal is dropped and a second, different, pilot is supplied to directional control valve 92, causing it to shift so that the extract cylinder 76 begins to extend. Further, the previous pilot signal is dropped and a second, different, pilot is supplied to directional control valve 96, causing it to shift, so the stop cylinder is extended. This stops the movement of the extension assembly 24 positioning the expansion fingers 54a–54f within the longitudinal plane defined by the annular head 40. No pilot is supplied to an expand directional control valve 98, causing the expand cylinder 68 to elongate and expand apart expansion fingers 54a–54f thereby increasing the internal diameter of the elastic sleeve 28. During this operation, directional control of the pneumatic source is governed by shuttle valves 100a–100c, which control the flow of air from control knob 84. Next, the operator inserts the tube assembly 34, as shown in FIG. 4a, until it hits the movement stop 67 of the extension assembly 24 thereby aligning the fitting 30 with the elastic sleeve 28. The control knob 84 is then switched to the retract setting.

Initially, during the retract setting, no pilot is supplied to a clamp directional control valve 102 or to the stop directional control valve 96 causing the clamp cylinders 48a–48f to activate and push the elastic sleeve 28 against the fitting 30. Respective stop and clamp volume chambers, 104 and 106, act as delay mechanisms.

When the stop volume chamber 104 ceases to act as a delay mechanism, the pilot to the stop flow control valve 96 becomes functional, deactivating the stop cylinder 78 allowing the extract cylinder 76 to fully extend. This pulls the expansion fingers 54a–54f out from in between the fitting 30 and the elastic sleeve 28. Next, when the clamp volume chamber 106 ceases to act as a delay mechanism, the pilot becomes functional for the clamp flow control valve 102 causing the clamp cylinders 48a–48f to retract and release the tube assembly 34. Finally, the control knob 84 is returned back to the extended setting and the cycle is repeated until all the tube assemblies 34 have been properly masked.

By these arrangements, the masking apparatus 20 and process for applying an elastic mask 28 allow the masking of a variety of different sized tube assemblies with an inexpensive material. The masking is performed in a reliable and consistent manner. Further, the apparatus 20 allows an operator to dramatically reduce the cycle time required for both masking and removing a mask from a fitting.

Except as otherwise disclosed herein, the various components shown in outline or block form are individually well known, and their internal construction and their operation is not critical either to the making or using of this invention or to a description of the best mode of the invention.

While the detailed description above has been expressed in terms of a specific example, those skilled in the art will appreciate that many other configurations could be used to accomplish the purpose of the disclosed inventive apparatus and process. Accordingly, it would be appreciated that various equivalent modifications of the above-described embodiment may be made without departing from the spirit and scope of the invention. Therefore, the invention is to be limited only by the following claims.

What is claimed is:

1. A masking application apparatus that masks a predesignated portion of a component assembly with an elastic sleeve, said apparatus comprising:
   a housing;
   a clamping assembly for supporting the portion of the component assembly inserted into the apparatus, wherein said clamping assembly includes an annular head having an orifice through which the portion of the component assembly is inserted;
   an extension assembly that expands a diameter of the elastic sleeve to a diameter equal to or greater than a diameter of the predesignated portion of the component assembly, wherein said extension assembly is movable relative to the clamping assembly; and
   a drive assembly for moving the extension assembly relative to the housing and the clamping assembly.

2. The masking application apparatus according to claim 1, wherein said housing includes:
   a base having a length and width that supports the apparatus; and
   a machine cabinet that substantially encloses the masking application apparatus.

3. The masking application apparatus according to claim 2, wherein said machine cabinet further includes an alignment porthole for allowing insertion of the portion of the assembly into the apparatus.

4. The masking application apparatus according to claim 1, wherein said clamping assembly includes a support, which is coupled to said base and holds the clamping assembly in a fixed position relative to said housing.

5. The masking application apparatus according to claim 1, wherein said annular head includes a plurality of side holes orthogonal to a radial axis of said main orifice.

6. The masking application apparatus according to claim 1, wherein the clamping assembly includes a plurality of radial clamps coupled to the annular head.

7. The masking application apparatus according to claim 6, wherein each of said radial clamps includes a clamp cylinder; and a radial piston having a proximal end coupled to the clamp cylinder, and a distal end shaped to engage the inserted portion of the assembly.

8. The masking application apparatus according to claim 7 wherein each of the plurality of radial clamps is mounted relative to a respective one of the side holes, such that the piston of each of the radial clamps passes through a respective one of the side holes.

9. The masking application apparatus according to claim 1, wherein said extension assembly includes a plurality of expansion fingers movable relative to the clamping assembly.

10. The masking application apparatus according to claim 9, wherein said extension assembly includes a plurality of expansion fingers movable relative to both a radial axis and a longitudinal plane of said annular head.

11. The masking application apparatus according to claim 9, wherein the extension assembly further includes a plurality of levers having a distal and proximal end, wherein the distal end is coupled to a respective one of said expansion fingers.

12. The masking application apparatus according to claim 11, wherein said extension assembly further includes a stainless steel containment tube having mounted therein each of said plurality of levers, wherein said distal end of each of said levers is swingingly engaged to said containment tube and acts as a fulcrum.

13. The masking application apparatus according to claim 12, wherein said plurality of levers are spring loaded to keep the proximal end of said levers centered toward the radial axis of said containment tube.

14. The masking application apparatus according to claim 12, wherein said extension assembly further includes a pneumatic expansion cylinder contained in said containment tube, said cylinder having an expansion piston.

15. The masking application apparatus according to claim 14, wherein the extension assembly further includes a cylindrical ramp coupled to the expansion piston, and driven against said plurality of levers by said expansion cylinder to drive each of said plurality of levers and the respective expansion fingers away from the radial axis of said containment tube.

16. The masking application apparatus according to claim 15, wherein said extension assembly further includes a forward guide plate coupled to an end of said containment tube through which said plurality of expansion fingers pass wherein said forward guide plate guides and limits the movement of each of said plurality of expansion fingers.

17. The masking application apparatus according to claim 16, wherein said drive assembly includes:

a coupling ring for supporting said extension assembly;

a guide bar positioned along the length of said base; and a moving platform attached to said coupling ring and slidingly engaged to said guide bar allowing movement of said extension assembly along said guide bar.

18. The masking application apparatus according to claim 17, wherein said drive assembly further includes:

an extract cylinder positioned within said moving platform to drive said platform along the length of said guide bar; and a stop cylinder positioned along said guide bar to stop the movement of said platform beyond a predetermined point on said guide bar.

* * * * *